United States Patent [19]

Jarret et al.

[11] 4,343,154

[45] Aug. 10, 1982

[54] MOTIVE DEVICE FOR CONVERTING A VARIATION IN TEMPERATURE INTO MECHANICAL ENERGY

[76] Inventors: Jean M. Jarret, 4 rue de Mareil, Montainville 78124 Mareil sur Mauldre; Jacques H. Jarret, 32, allee des Soudanes, 78430 Louveciennes, both of France

[21] Appl. No.: 962,023

[22] Filed: Nov. 20, 1978

[30] Foreign Application Priority Data

Nov. 28, 1977 [FR] France ............................ 77 35790

[51] Int. Cl.³ .............................................. F03G 7/06
[52] U.S. Cl. ................................................... 60/527
[58] Field of Search ........................... 60/516, 527, 671

[56] References Cited

U.S. PATENT DOCUMENTS

| | | | |
|---|---|---|---|
| 3,256,686 | 6/1966 | Lindberg, Jr. .......................... | 60/516 |
| 3,574,275 | 4/1971 | Staschke ................................ | 60/527 |
| 3,782,121 | 5/1972 | Marcoux et al. ...................... | 60/527 |
| 3,987,630 | 10/1976 | Hein et al. ............................ | 60/527 |

FOREIGN PATENT DOCUMENTS 2116266 7/1972 France .
2182876 12/1973 France .

Primary Examiner—Stephen A. Kreitman

[57] ABSTRACT

The invention relates to a motive device adapted to convert a variation in temperature to which it is subjected into mechanical energy, constituted by a piston mounted to slide by one of its ends in a first chamber and by the other of its ends in a second chamber, said chambers being connected with each other so as to define in the first chamber a first closed volume and in the second chamber a second closed volume, particularly larger than the first, each of said volumes being filled with elastomer under pressure so that each chamber and each corresponding end of the piston constitute a spring involving the hydrostatic compression of the elastomer. The invention is applied to the construction of devices for thermally regulating the functioning of a mechanism.

4 Claims, 1 Drawing Figure

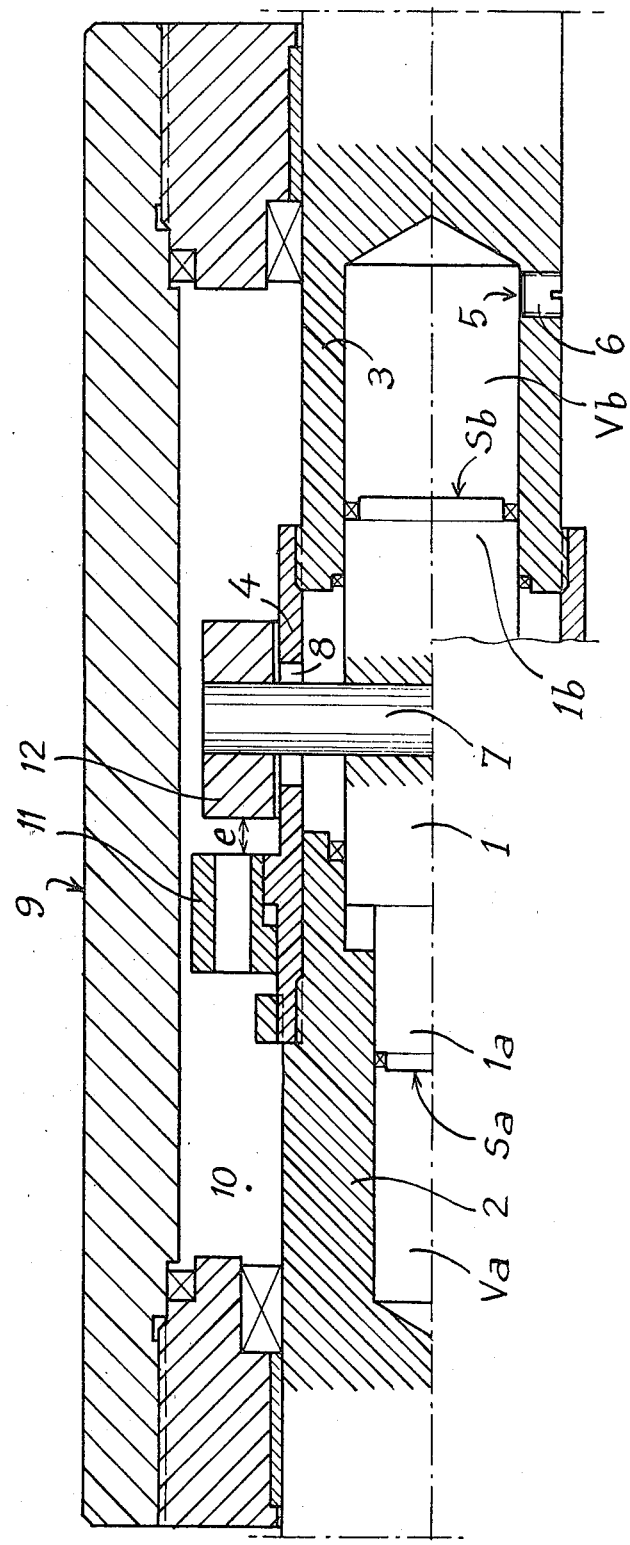

MOTIVE DEVICE FOR CONVERTING A VARIATION IN TEMPERATURE INTO MECHANICAL ENERGY

BACKGROUND OF THE INVENTION

A large number of devices are known, adapted to convert a variation in temperature to which they are subjected, into mechanical energy adapted to be picked up at an outlet member of the device which develops a force during a displacement.

These devices use the expansion of solid, liquid or gaseous bodies as means for converting the energy. The variations in dimensions of these bodies under the effect of the temperature variations are either used directly or amplified or converted by the addition of mechanical gearing-down mechanisms or the like.

However, these devices are used only for developing weak energy. To increase the energy furnished, the parameters influenced by the coefficient of expansion of the heat-sensitive material (dimensions, volume, pressure . . .) must be considerably increased and, on doing so, technological, manufacturing or cost limits are soon encountered, which make this extrapolation impossible.

The present invention enables an interesting result to be obtained in this domain, i.e. the furnishing of considerable energy by using a heat-sensitive material as energy converter, whilst remaining within the limits set forth hereinabove concerning the production of the means employed, by proposing a device of simple design.

To this end, the invention relates to a motive device adapted to convert a variation in temperature to which it is subjected into mechanical energy, constituted by a piston mounted to slide by one of its ends in a first chamber, and by the other of its ends in a second chamber, said chambers being connected with each other so as to define in the first chamber a first closed volume and in the second chamber a second closed volume, particularly larger than the first, each of said volumes being filled with elastomer under pressure so that each chamber and each corresponding end of the piston constitute a spring involving the hydrostatic compression of the elastomer. In addition, said piston is provided with at least one radial element projecting outwardly of the said chambers, allowing the energy furnished to be used.

The front surface of the end of the piston cooperating with the second chamber is preferably greater than the one cooperating with the first chamber. Finally, each chamber comprises a device for regulating the pressure.

The invention will be more readily understood on reading the following description with reference to the accompanying drawings, in which:

BRIEF DESCRIPTION OF FIGURE

The single FIGURE illustrates in half-section an embodiment of a device according to the invention, used as thermal regulator of a damping device.

DETAILED DESCRIPTION

Referring now to the drawings, this FIGURE shows a piston 1, one end 1a of which, of section Sa, is mounted to slide in a first chamber 2 so as to define therewith a first closed volume Va. The other end 1b of the piston 1, of section Sb, is mounted to slide in a second chamber 3 and defines in this chamber a second closed volume Vb. Said chambers 2 and 3 are connected with each other by means of a threaded ring 4. The volumes Va and Vb are different and it will be assumed that volume Vb is greater than volume Va. These volumes are filled with elastomer under high pressure by means of threaded orifices, closed by plunger stoppers constituting members for regulating the pressure in each chamber. Only orifice 5 and its stopper 6, relative to volume Vb, have been shown in the FIGURE. Thus constituted, the device according to the invention is in the form of two springs involving the hydrostatic compression of the elastomer, mounted in opposition, forming motor for converting a varition in temperature into mechanical energy (displacement of piston 1).

In fact, for a given temperature, the position of equilibrium of the piston 1 with respect to the chambers 2 and 3 is such that the force applied on the end 1a of the piston 1 is equal to that applied on its end 1b, i.e. if the surfaces Sa and Sb are equal, when the pressure of the elastomer of volume Va is equal to the pressure of the elastomer of volume Vb or, if Sb are not equal, when the product Sa, Pa (pressure in the volume Va) is equal to the product Sb, Pb (pressure in the volume Vb). The elastomer is a material having a coefficient of expansion much higher than that of the steel which for example is the material constituting the chambers 2 and 3. A rise in temperature of the whole modifies the state of equilibrium of the piston 1. In fact, the increase in volume of the elastomer contained in the chamber 3 is greater than that contained in chamber 2. A displacement of the piston 1 is then produced, such that the condition of equilibrium is again fulfilled, i.e. for Vb greater than Va by penetration of piston 1 in chamber 2.

Inversely, a reduction in temperature provokes a movement of the piston 1 in the other direction.

Taking into account the value of the pressures existing in the chambers (of the order of a thousand bars), the displacement of piston 2 is effected under a considerable force which is, of course, function of the difference of volumes Va and Vb.

This displacement and this force may be picked up by means of a radial element 7, fast with the piston 1 and passing through the ring 4 connecting the two chambers through a slot 8. In the case of the FIGURE, the device according to the invention is used for regulating, as a function of the temperature, the damping characteristics of a viscous fluid damping device. Thus the assembly composed of chambers 2 and 3 and ring 4, constitutes an element which is slidably movable with respect to an envelope 9, the space 10 between said envelope and said assembly being filled with a viscous fluid, or an elastomer under pressure. A ring 11, provided with at least one perforation, fast with assembly 2, 3 and 4, divides the space 10 so that, upon a relative displacement of the assembly 2, 3, 4 with respect to the envelope 9, there is an effect of damping by forced passage of said fluid through the perforations of the ring 11. The viscosity of the fluid decreasing with the rise in temperature, the damping power diminishes. It is therefore necessary to act on the value of the constriction at the level of ring 11, by reducing it to compensate for the lowering of the viscosity. To this end, a plug 12 is placed opposite the perforations of the ring 11, at an axial distance e from the ring.

The plug 12 is coupled to the radial element and a rise in temperature bringing about a displacement of the piston 1 towards the chamber 2 provokes a reduction of this distance therefore a reduction in the section of passage of the viscous fluid between the two parts of the space 10 divided by the ring 11.

It will be noted that the device according to the invention allowing a displacement of the piston 1 by developing a considerable force, enables the variation of the distance e under the effect of the temperature to be ensured whatever the viscosity of the damping fluid which may be very high if said latter is an elastomer under pressure.

The invention finds advantageous application in the field of devices controlling the operation of a mechanism as a function of temperature.

What is claimed is:

1. A motive device adapted to convert a variation in temperature to which it is subjected into mechanical energy, said device including first and second piston chambers rigidly secured to each other and having different cross-sectional dimensions, a piston having first and second ends slidably mounted with said first end in said first chamber, and its second in said second chamber, said piston ends and chambers cooperating to define in the first chamber a first closed volume and in the second chamber a second closed volume, larger than the first closed volume, each of said volumes being filled with elastomer under pressure and each of said chambers including separate means for establishing and regulating pressure therein whereby each chamber and corresponding end of the piston constitute a spring involving the hydrostatic compression of the elastomer.

2. The device of claim 1, wherein said piston is provided with at least one radial element projecting outwardly of the said chambers, allowing the energy furnished to be used.

3. The device of claim 1, wherein the front surface of the end of the piston cooperating with the second chamber is greater than the one cooperating with the first chamber.

4. A motive device adapted to convert a variation in temperature to which it is subjected into mechanical energy, comprising first and second piston chambers rigidly secured to each other, a piston mounted to slide by one of its ends in said first chamber and by the other of its ends in said second chamber, said chambers and piston ends cooperating to define in the first chamber a first closed volume and in the second chamber a second closed volume larger than the first volume, each of said volumes being filled with elastomer under pressure so that each chamber and each corresponding end of the piston constitute a spring involving the hydrostatic compression of the elastomer, said chambers defining an element sliding in an envelope filled with a damping fluid and having a perforated ring mounted thereon dividing said envelope into two parts, at least one radially extending element secured to said piston and projecting outwardly of said chambers and a plug mounted on said radially extending element opposite the perforations in said ring and separated axially therefrom by a distance whose value defines the section of passage of the fluid from one part of the envelope to the other upon a relative movement of the sliding element with respect to the envelope.

* * * * *